Nov. 8, 1966  J. H. WILTSE  3,283,922

TRANSPORTER

Filed July 3, 1964  3 Sheets-Sheet 1

INVENTOR.
JOHN H. WILTSE.
BY D. Emmett Thompson
HIS ATTORNEY.

Nov. 8, 1966  J. H. WILTSE  3,283,922
TRANSPORTER
Filed July 3, 1964  3 Sheets-Sheet 3
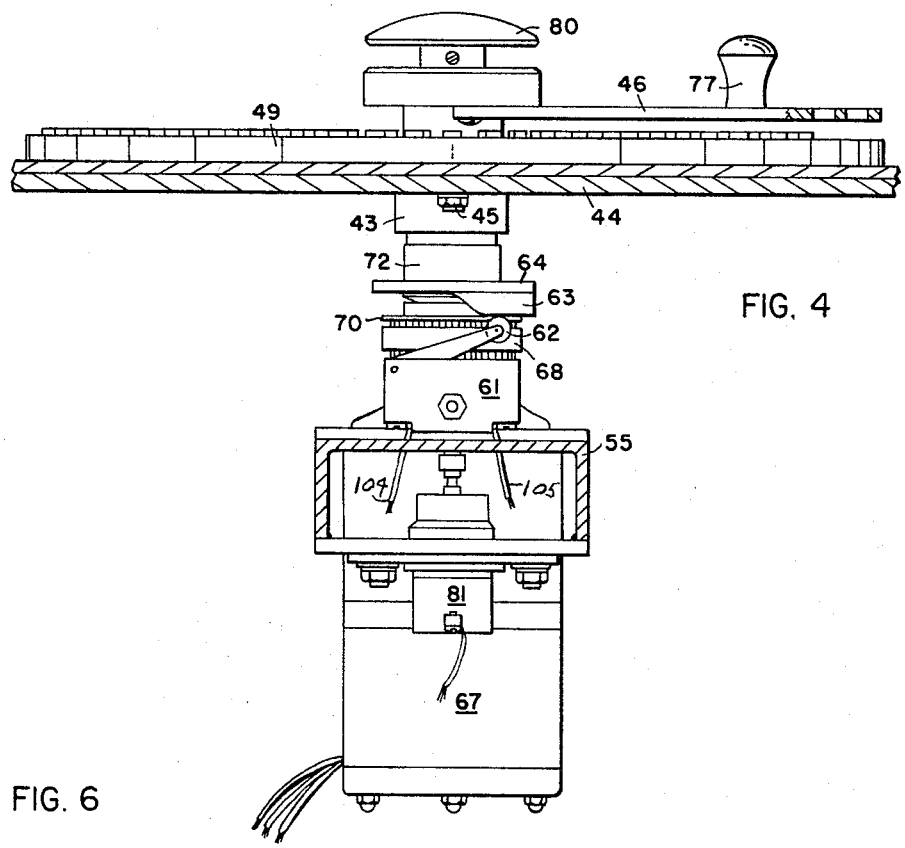
FIG. 4
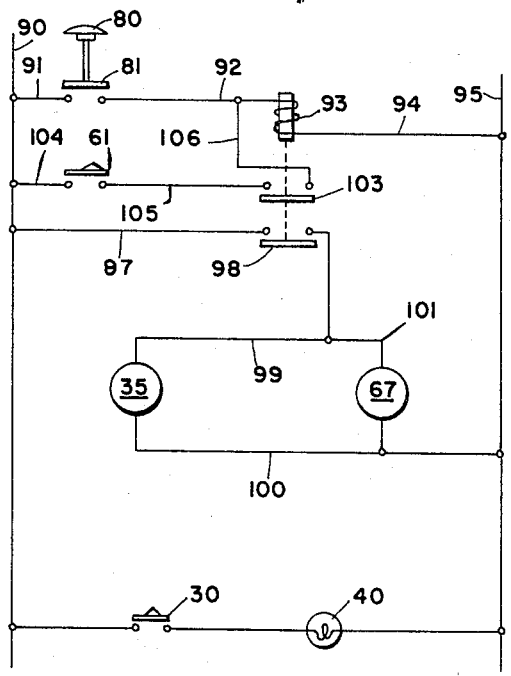
FIG. 6
FIG. 5
INVENTOR.
JOHN H. WILTSE.
BY
D. Emmett Thompson
HIS ATTORNEY.

United States Patent Office 3,283,922
Patented Nov. 8, 1966

1

3,283,922
TRANSPORTER
John H. Wiltse, Hannibal, N.Y., assignor to Lamson Corporation, Syracuse, N.Y., a corporation of New York
Filed July 3, 1964, Ser. No. 380,154
4 Claims. (Cl. 214—11)

This invention relates to transporter apparatus for advancing articles from a loading station to a selected work station. Apparatus of this type includes a conveyor, usually of the endless belt type, which extends from the loading station to and past a plurality of work stations. Articles positioned on the conveyor are advanced to a desired work station to supply the operator at that station with articles, or work pieces, on which the operator performs certain operations. Transporters of this type are used extensively, for example, in shoe factories, garment making factories, etc.

This invention has as an object a transporter apparatus embodying a novel control mechanism with which the work dispatcher can quickly and conveniently set the control mechanism for a selected work station, and when the article positioned on the conveyor has arrived at that work station the conveyor will stop.

The invention has as a further and more particular object a control mechanism which can be quickly adjusted without the use of any tools to accommodate any spacing of the work stations along the conveyor.

The invention consists in the novel features and in the combinations and constructions hereinafter set forth and claimed.

In describing this invention, reference is had to the accompanying drawings in which like characters designate corresponding parts in all the views.

In the drawings—

FIGURE 4 is a sectional view taken on line 4—4, FIGURE 3.

FIGURE 5 is an enlarged sectional view taken on line 5—5, FIGURE 2.

FIGURE 6 is a schematic wiring diagram of the electrical circuity employed in the control mechanism.

Figures 1, 2:
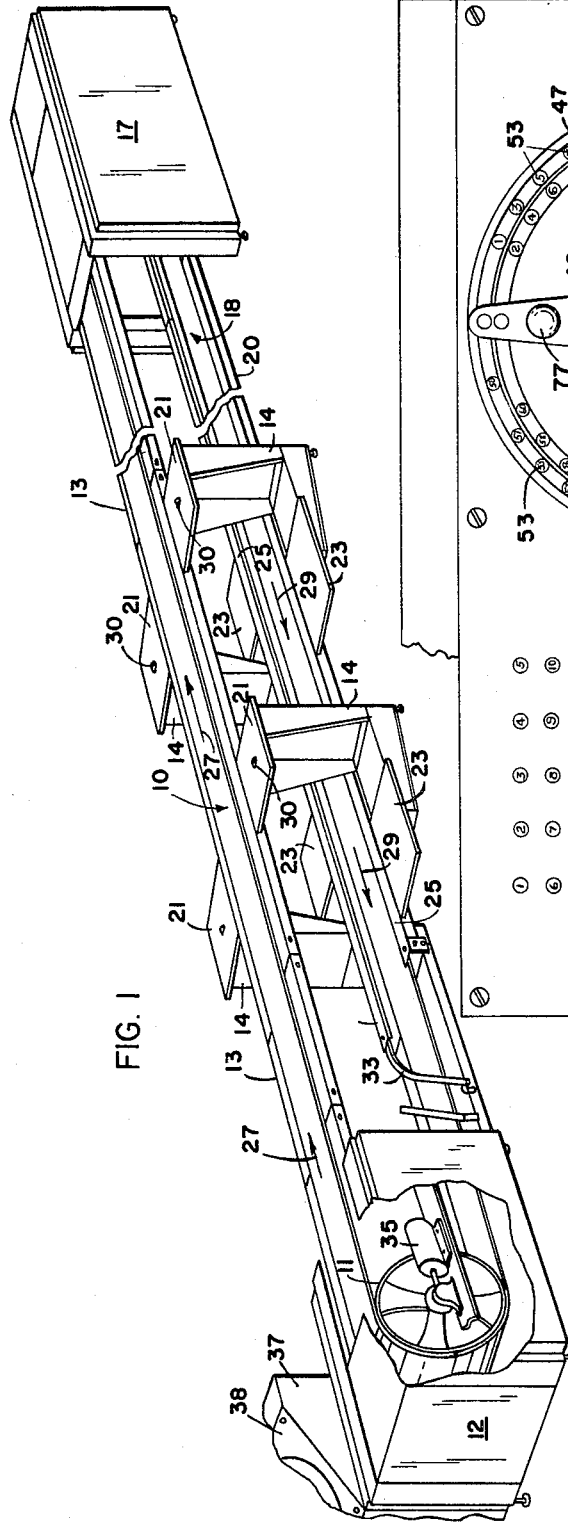
FIGURE 1 is a perspective view of a transporter apparatus with which the control mechanism is used.
FIGURE 2 is a top plan view, with parts broken away, of the control cabinet.

Referring to FIGURE 1, 10 designates the upper run of a conveyor belt which is trained over a pulley 11 journalled in housing 12 at the loading station. The upper run 10 of the conveyor belt is supported by a frame structure including top members 13 supported by pedestals 14. The conveyor framework extends an appreciable distance from the loading station and there is a pedestal structure 14 at each work station, and the work stations may pe arranged on both sides of the belt 10, as illustrated in FIGURE 1.

At the outer end of the conveyor framework there is a housing 17 in which another pulley is journalled and over which the belt is trained. The return run 18 of the belt is supported on members 20 also carried by the pedestals 14.

There is a shelf 21 mounted on the upper end of each of the pedestals 14, the shelves being arranged substantially coplanar with the plate members 13 over which the belt 10 moves. There is also a lower shelf 23 affixed to each of the pedestals 14, these shelves being arranged substantially coplanar with the upper face of guide rails 25 extending along each side of the return run 18 of the conveyor belt.

2

In operation, the upper run 10 of the conveyor belt moves to the right, FIGURE 1, as indicated by the arrows 27, and the lower run of the belt moves toward the loading station, as indicated by the arrows 29.

In operation, an article, or container, loaded with work pieces, is placed on the upper run 10 of the conveyor belt at the loading station. The control mechanism is then set for a desired work station, and the conveyor is started. When the container arrives at the desired work station, the belt stops and the machine operator slides the container off from the upper run 10 of the belt onto the shelf 21. A switch is mounted underneath each of the shelves 21 and these switches have actuators 30 which project through the shelves 21. When the article, or container, is removed from the conveyor belt 10 onto the shelf 21, the switch is actuated to cause its contacts to open. Normally the machine operator removes the first box from the shelf 21 onto the machine table, and accordingly the contacts of the call switch are closed to energize a call light at the loading station to inform the dispatcher that there is no box on the shelf 21 at that station, so he can accordingly dispatch another container to that station.

When the operator completes the operations on the work pieces in a container, the container is placed upon the lower shelf 23; as the work pieces are processed, they are placed in the container. When the container is filled, it is moved onto the return run 18 of the conveyor belt. The containers are guided between the guide rails 25, one of which has a curved end portion 33 for directing the articles, or containers, off from the lower run 18 of the belt when they arrive at the loading station. The conveyor belt is operated by a synchronous motor 35 operatively to connect to the pulley 11.

Figure 3:
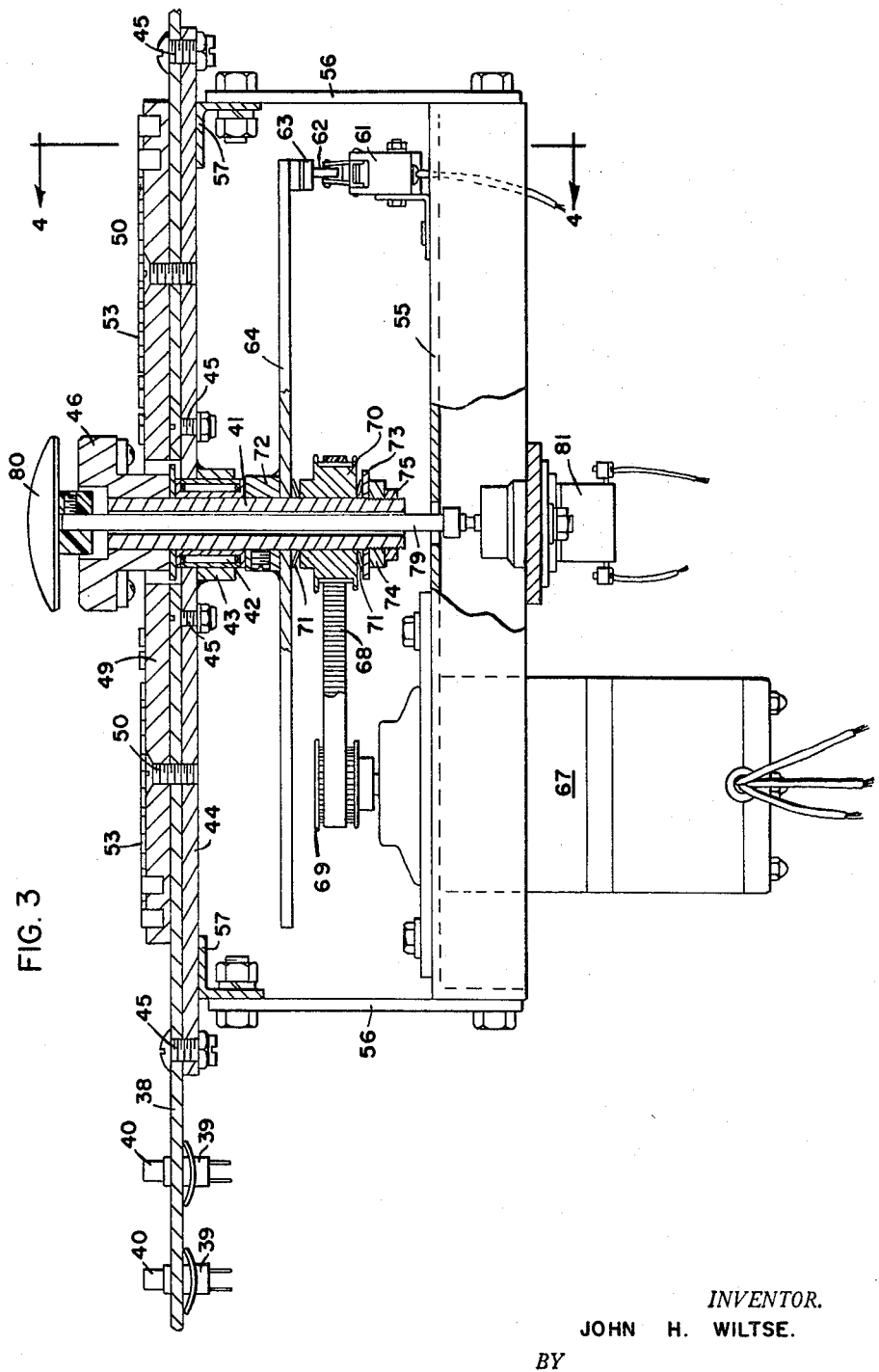
FIGURE 3 is a sectional view taken on line 3—3, FIGURE 2.

The control mechanism is mounted in a control cabinet 37 positioned adjacent the cabinet 12. The cabinet 37 is formed with an inclined top wall 38 in which are mounted a plurality of call lights, as shown in the left portion of FIGURE 2, there being a call light corresponding to each work station along the conveyor. The call lights consist of small electrical lamps mounted in receptacles 39 secured to the top plate 38 of the control cabinet, see FIGURE 3. Each of the lamps is enclosed by a transparent plastic cap 40, the upper closed end of which bears a number coresponding to a work station. A shaft 41 is journalled in a bearing 42 mounted in a retainer cup 43 fixed to a plate 44, fixed to the cabinet top 38, as by bolts 45. The upper end of the shaft has fixed to it a pointer 46, the outer end portion of which moves upon rotation of the shaft over circular grooves 47, 48, formed in a circular plate 49, which is attached to the cabinet top 38, as by screws 50, see FIGURE 3. There are a plurality of caps 53 positioned in the grooves 47, 48. These caps are of cylindrical form having a closed top wall, see FIGURE 5. The diameter of the caps 53 is slightly greater than the radial width of the slots 47, 48, whereby the caps 53 are frictionally retained in the grooves 47, 48. The top wall of each of the caps 53 is provided with a station number, whereby they serve as work station indicating members.

There is an inverted channel member 55 affixed at its ends to straps 56, the upper ends of which are affixed to angle members 57 affixed, as by welding, to the plate 44. The cross member 55 extends diametrically of the axis of the shaft 41, and it has affixed to it a switch 61, which has an actuator 62 engaged by a boss 63 on an arm 64. In the arrangement disclosed, the arm 64 extends radially from the shaft 41 at an angle of 90° to the pointer 46, see FIGURES 2 and 4. In FIGURES 2 and 4, the pointer 46 is in the zero position. It may be moved in either direction to position the outer end of the pointer over a selected one of the station indicators 53. When the pointer 46 is rotated in a clockwise direction, FIGURE 2, so that the outer end of the pointer is positioned over the station indicator 53, for station 14, indicated at 66, FIGURE 2, the switch actuating arm 64 will be advanced at corresponding distances in a clockwise direction from the switch 61.

A synchronous motor 67 is mounted on the cross member 55 and is operatively connected to the shaft 41. This connection is effected by a timer belt 68 trained over a pulley 69 on motor 67, and a pulley 70 mounted on shaft 41. There is a dished spring washer 71, commonly known as a Belleville washer, mounted on shaft 41 intermediate the upper end of the pulley 70 and the hub portion 72 of arm 64. There is a similar washer mounted on the shaft between the lower end of the pulley and a plain washer 73. There is an adjusting nut 74 threaded on the lower end of the shaft for compressing the Belleville washers 71, to thereby establish a frictional engagement between the pulley 70 and the shaft 41. The nut 74 is held in adjusted position by a jam nut 75.

When the motor 67 is energized, it rotates the shaft 41 and the pointer 46 in a counter-clockwise direction, FIGURE 2. When, by this reverse movement of the shaft 41, the pointer 46 is returned to initial, or starting, position, the arm 64 will engage the actuator 62 of switch 61 to open the contacts of the switch. As will be hereinafter explained, the opening of the contacts of switch 61 de-energizes the motor 67 and simultaneously, the conveyor motor 35. The frictional engagement between the pulley 70 and the shaft 41 is sufficient to effect this reverse rotation of the shaft. However, it permits the shaft to be rotated manually by the pointer 46 which is provided with a convenient knob 77. The shaft 41 is a hollow shaft and there is slidably mounted in shaft 41, a stem 79, the upper end of which is provided with an operating button 80. The lower end of the shaft is operatively connected to a switch 81 fixedly mounted on the cross member 55.

In operation, the dispatcher at the loading station will place a container of work parts on the upper run 10 of the conveyor belt and turn the pointer 46 to the indicator 53 comparable to the station to which the container is to be delivered. He then presses on the button 80 to close the contacts of switch 81. Referring to FIGURE 6, this establishes a circuit from the side 90, wire 91, switch 81, wire 92, relay coil 93, wire 94, to the opposite side 95 of the supply. This establishes a circuit from the side 90 through wire 97, contacts 98 of relay 93, wire 99, conveyor motor 35, wire 100, to the opposite side 95. It also establishes a branch circuit from wire 99, through wire 101, to the synchronous motor 67, wire 100, to the wire 95. Accordingly, the conveyor starts forwardly and the shaft 41 and arm 64 rotate in counter-clockwise direction. In order to maintain this circuitry, the relay 93 is provided with hold contacts 103 to provide a hold circuit from wire 90, through wire 104, contacts of switch 61, wire 105, contacts 103, wire 106, to the relay coil 93. Accordingly, the shaft 41 and arm 64 are moved in reverse direction in timed relation to the advancement of the conveyor belt 10. Therefore, when the container of work pieces arrives at the selected station, the arm 64 will actuate switch 61 to open the contacts and thus break the hold circuit of relay 93 and de-energize both the motors 35 and 67, as will be apparent.

It will appear, on short meditation, that the invention described has a number of advantages. For example, the control cabinet 37, including the control mechanism mounted therein, can be completely constructed at the factory and shipped to the job to be positioned at the loading station of the conveyor. There are no mechanical interconnections between the conveyor, or conveyor drive, and the control mechanism. It is only necessary to effect the simple wiring connections, as shown in FIGURE 6.

Also, the station indicators 53 may be readily moved in the slots 47, 48, to position accurately corresponding to the work stations along the run of the conveyor. Accordingly, the control apparatus is very advantageous for use in conjunction with a transporter conveyor already installed. It is also advantageous in the event the spacing of the work stations is subsequently changed, or others added thereto.

As previously explained, the machine operator will slide the loaded container of work parts off from the upper run of the belt 10 onto the shelf 21, opening the contacts of the switch associated with the actuator 30. Upon transfer of the loaded container of work parts to the machine table, the contacts of the switch will close, energizing the corresponding call lights in the table top 38, whereby the dispatcher will be informed that the machine operator at that station will, in the near future, need another container of the parts.

It will be apparent that the control mechanism can be readily embodied in any type of conveyor system presently in operation and will function to transport articles to any selected work station along the conveyor. The only necessary change in the existing conveyor is to provide the conveyor with a synchronous motor for its operation.

The convenient shifting of the station indicators 53 is an important feature of my invention inasmuch as the conveyor can be controlled to stop at a selected point within very close limits, this being accomplished simply by moving the indicators 53 in the grooves formed in the plate 49.

What I claim is:

1. A transporter system for advancing articles from a loading station to a selected work station, an endless conveyor having a run extending from the loading station to and past a plurality of work stations spaced along said conveyor, a constant speed motor for operating said conveyor for the advancement of articles thereby from said loading station, a support at said loading station, a series of station indicators mounted on said support and arranged in an elongated path, said station indicators being adjustable along said path to effect spacing of said indicators comparable to the spacing of said work stations, a pointer manually movable from a start position along said series into registration with a selected one of said station indicators, a synchronous motor connected to said pointer and operable when energized to return said pointer to start position, and switch means for simultaneously energizing said motors and for simultaneously de-energizing said motors upon return of said pointer to start position.

2. A transporter system as set forth in claim 1, wherein said station indicators have frictional engagement with said support, whereby said indicators may be individually adjusted along said path.

3. A transporter system as defined in claim 1, including a clutch mechanism between said synchronous motor and said pointer, whereby said pointer may be moved manually independently of said synchronous motor.

4. A transporter system as defined in claim 1, wherein said elongated path is in the form of a groove and the station indicators have frictional engagement with said groove for adjustment therealong.

References Cited by the Examiner
UNITED STATES PATENTS

| | | | |
|---|---|---|---|
| 2,698,658 | 1/1955 | Coren | 38—152 |
| 3,128,867 | 4/1964 | Karcher | 198—19 |
| 3,138,235 | 6/1964 | Collette | 198—40 |

EVON C. BLUNK, *Primary Examiner.*

RICHARD E. AEGERTER, *Examiner.*